July 15, 1930.   S. R. SPATENGA   1,770,498
APPARATUS FOR CUTTING AND BEVELING GLASS
Original Filed Oct. 6, 1920   3 Sheets-Sheet 3

Inventor:
Stephen R. Spatenga
By his Attorney
Chas. M. Chapman

Patented July 15, 1930

1,770,498

UNITED STATES PATENT OFFICE

STEPHEN R. SPATENGA, OF GLENDALE, NEW YORK

APPARATUS FOR CUTTING AND BEVELING GLASS

Application filed October 6, 1920, Serial No. 415,041. Renewed November 10, 1926.

This invention relates to apparatus for cutting, beveling, grinding and polishing glass, crystal and similar substances, and, particularly, relates to a machine adapted for producing window panes, sight glasses, or transparent closures for automobile curtains, covers and for many other similar purposes.

Among the objects of my invention may be noted the following: to provide apparatus for grinding, cutting, beveling and polishing pieces of glass, crystal or similar substances according to a predetermined pattern, shape or form; to provide a means for holding the glass, or crystal, or other work, in position to be cut, ground or polished, said means including a member adapted to be shifted so as to release and to clamp the work in proper position for operation; to provide, in apparatus of the kind noted, a means for determining or gaging the position of the work when placed in the machine, and said means may include a part adjustable at the front of the work so as to properly center or locate it laterally, and also a gage adapted to regulate the elevation of the work, or locate it vertically, as a preliminary to the cutting operation; to provide means including a pattern by which to determine the size, shape or peripheral conformation, said pattern or cam being so constructed as to enable it to gage or determine variations in size and form; to provide a support and actuating means for the grinding, cutting, beveling or polishing tool which will control the position of the cutter, its angular relation to the glass or other work being operated upon, and its path of travel or operation; to provide a means, under control of the operator, for shifting the cutting, grinding or polishing tool into various angular relations to the work being operated upon, whereby to produce upon the latter any desired or required beveled or angular edge; to provide means by which the cutter, grinder and polisher may be manipulated so as to vary the size of the work operated upon, and, therefore, the product for any given or predetermined pattern; to provide a combination of means whereby the glass, crystal, or other work operated upon may be positively held in position and caused to rotate, so that it may be cut or ground to the form of a predetermined pattern, and a means by which the size of the article to be produced may be varied, regardless of the size of the pattern, and a means by which the angle of bevel or cut may be predetermined, regardless of the size of the article produced; to provide a combination of means for actuating the cutter, the pattern, and the work, whereby to produce the various results, and bring about the various operations, and secure the various objects set forth in the foregoing; and to provide a simple, compact apparatus which is economical to produce and capable of securing all the results and objects set forth in the foregoing.

With the above objects in view and others which will be detailed during the course of this description, my invention consists in the parts, features, elements and combinations thereof hereinafter described and claimed.

In order that my invention may be clearly understood, I have provided drawings wherein.

Figure 1:
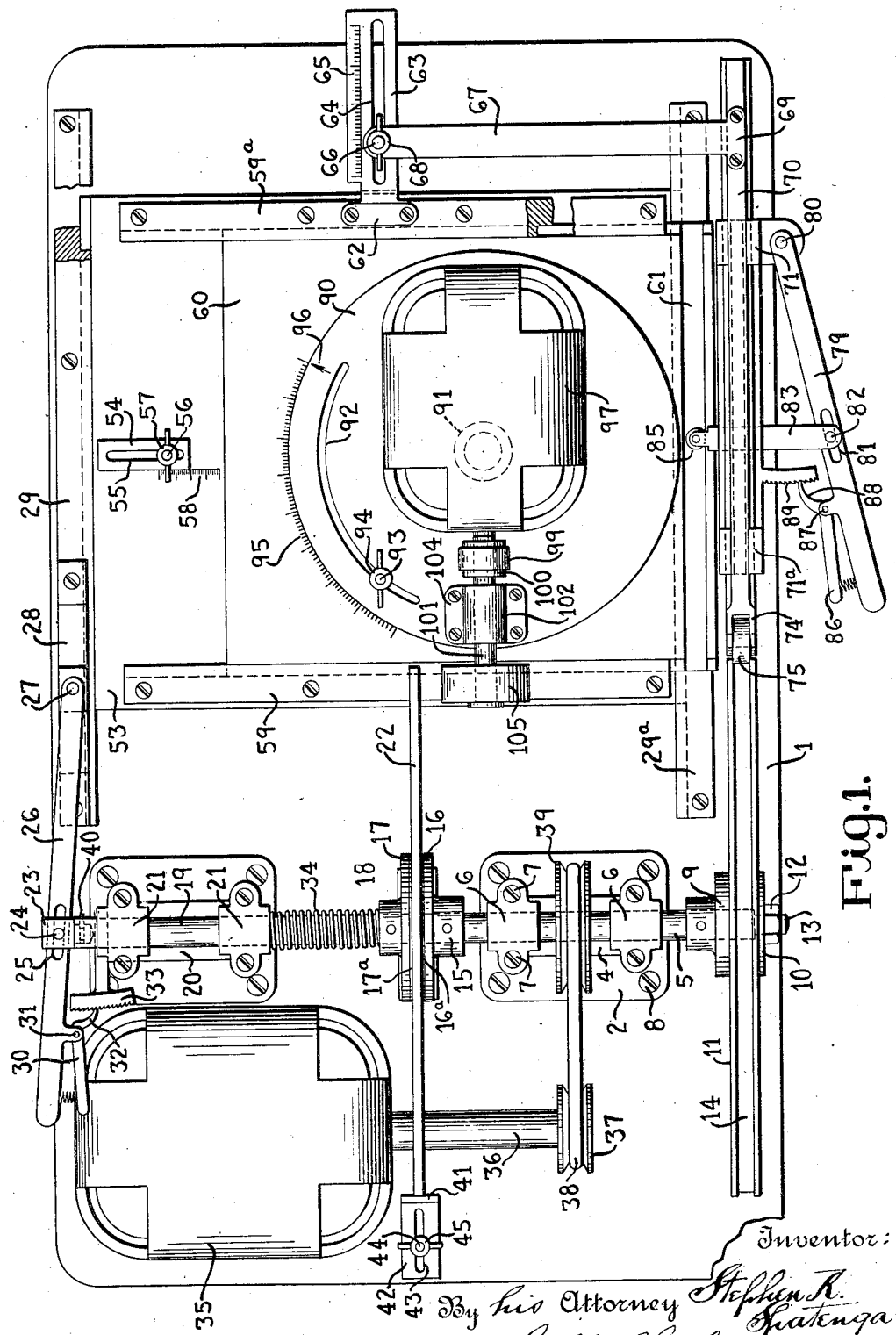
Figure 1 is a top plan view of my entire apparatus showing one form of my invention.

Referring to the drawings, the numeral 1 indicates a base, bed-plate, standard or frame on which the various devices of my apparatus are mounted, it being understood that I am not limited to the form of support shown, the same being illustrated as a mere example of a means for supporting the apparatus, with its various parts, interrelatedly and in a position of adjustment preparatory to beginning an operation. At the left end, referring to Figure 1, the bed-plate is provided with a shaft-support, the foot-plate 2 of which has upright 3 branched, at its upper end, into a yoke 4 affording bearings for a shaft 5, the latter being held in place and rendered removable by the journal-cap pieces 6 secured to the yoke 4 by screws or other suitable media 7. The foot-plate 2 is secured to the bed-plate 1 by means of screws, bolts or other securing media 8. The shaft 5 has fixed thereon, at one end, a disk 9 which, together with the plate 10, clamps and securely holds in place a pattern cam 11, the latter being secured in desired position on the shaft by being slipped thereunto and being clamped between the plate 10 and disk 9 by means of a nut 12 turned upon the screw-threaded end 13 of the shaft 5. Thus the pattern cam 11 may be held adjustably and removably in place and arranged on the shaft in desired manner. The pattern cam 11, in this instance of my invention, is shown to be oval, in general outline, and to have a peripheral groove 14 formed therein for the reception of an anti-friction guide roller presently described. The shaft 5, at its inner end, has fixed thereto a flanged hub 15, the discus portion 16 of which is one member of a clamp, the cooperating and similar member 17 of which is carried by a hub 18 on the inner end of a shaft 19 journaled in the yoke bearings 20 capped by the members 21, so that it may slide freely longitudinally under proper impulse. The two clamping disks 16 and 17 are faced, as at 16ª and 17ª, with felt, leather, rubber or other soft, yieldable, frictional material adapted to engage and clamp the work 22 when set between them. The work 22 may be a piece of glass, crystal or other desired material upon which the operation is to be performed and which is to be conformed to the pattern cam 11. In the particular instance shown, the oval form given to the work 22 adapts it for transparencies or curtain windows, such as used in the tops of automobiles and similar vehicles; but, it is to be understood that my invention is not confined to the production of this particular product, since various other products can be formed and made from other materials in my apparatus. The bearings 20 are formed, mounted and secured to the bed-plate, the same as the bearings 4.

The outer end of the shaft 19 has swiveled thereto a grooved block 23 provided with a pin 24 which passes through a slot 25 extended longitudinally of a lever 26, working in said block, pivoted at 27 to a fixture 28 secured to the base 1 or a guide-bar 29 secured to the bed-plate. The free end of the lever 26 is provided with a spring-controlled pawl 30 pivoted at 31 to the lever and having its angularly extended detent end 32 cooperating with a ratchet-bar 33 secured in any suitable manner to the yoke 20. By this means, the shaft 19 can be shifted lengthwise within the yoke bearing so as to open and close the clamp 16—17 to release and engage the work 22. A spring 34 surrounding the shaft 19 between the inner bearing thereof and the hub 18 engages the latter at one end and, at the opposite end, the inner bearing, the normal tendency of said spring being to force the clamping disk 17 against the work, and the latter against the disk 16, thus holding the work firmly in position, it being understood that the spring 34 is sufficiently strong to impose pressure on the work such that the latter will not turn in the clamp during the grinding or cutting operation. The base 1, at its rear left end, Figure 1, has suitably mounted thereon an electric motor 35, the shaft 36 of which is extended and provided with driving pulley 37, the belt 38 from which extends around the pulley 39 mounted upon the shaft 5 between its bearings. Thus the shaft 5 is rotated, in turn rotating the pattern cam 11, the clamp 16—17 and the work 22 therebetween, and the rotary shaft 19 in its bearings, the rotation of the latter being permitted by the swivel connection 40 between it and the bracket 23. At the left of the base 1, viewing Figure 1, an adjustable gage 41 is secured in position, the foot-piece 42 having an elongated slot 43 for receiving a screw 44, upon which a winged nut 45 is turned in order to clamp the gage in position for engagement with the periphery of the work 22 to be operated upon. To the right of said adjustable gage, the base has mounted thereon an angular bracket 46, the vertical portion of which has a screw 47 passing therethrough, on which a winged nut 48 turns, and the opposite end of which screw has a flat clamping head 49 for engagement with the angular gage 50, having an elongated slot 51 therein for vertical adjustment of the gage relatively to its support. The horizontal gage member 52 is adapted to be set under the work 22 and thus locate the same vertically relatively to the base of the apparatus. Gages 41 and 52 cooperate with the work 22 in a manner such as to locate or place the work in the work-clamp initially; that is to say, set it in the clamp properly relatively to the pattern cam 11 so that, when the shaft 5 is rotated, the proper conformation will be given to the work correspondingly with the shape of the cam 11. The two gage members also operate as a temporary support at bottom and end for the work, thus enabling the operator, when he shifts the clamp member 17 laterally away from the clamp member 16, to set the work on the gage 52 and against the gage 41, thus facilitating the location of the work in the clamp. Before the apparatus is set in operation and after the work has been clamped as stated, the gage 52 may be removed so that it will not interfere with the operation of the work during rotation. The gage 41, however, may be allowed to remain in position, since it will be at the extreme end of the path of movement of the work.

Figure 2:
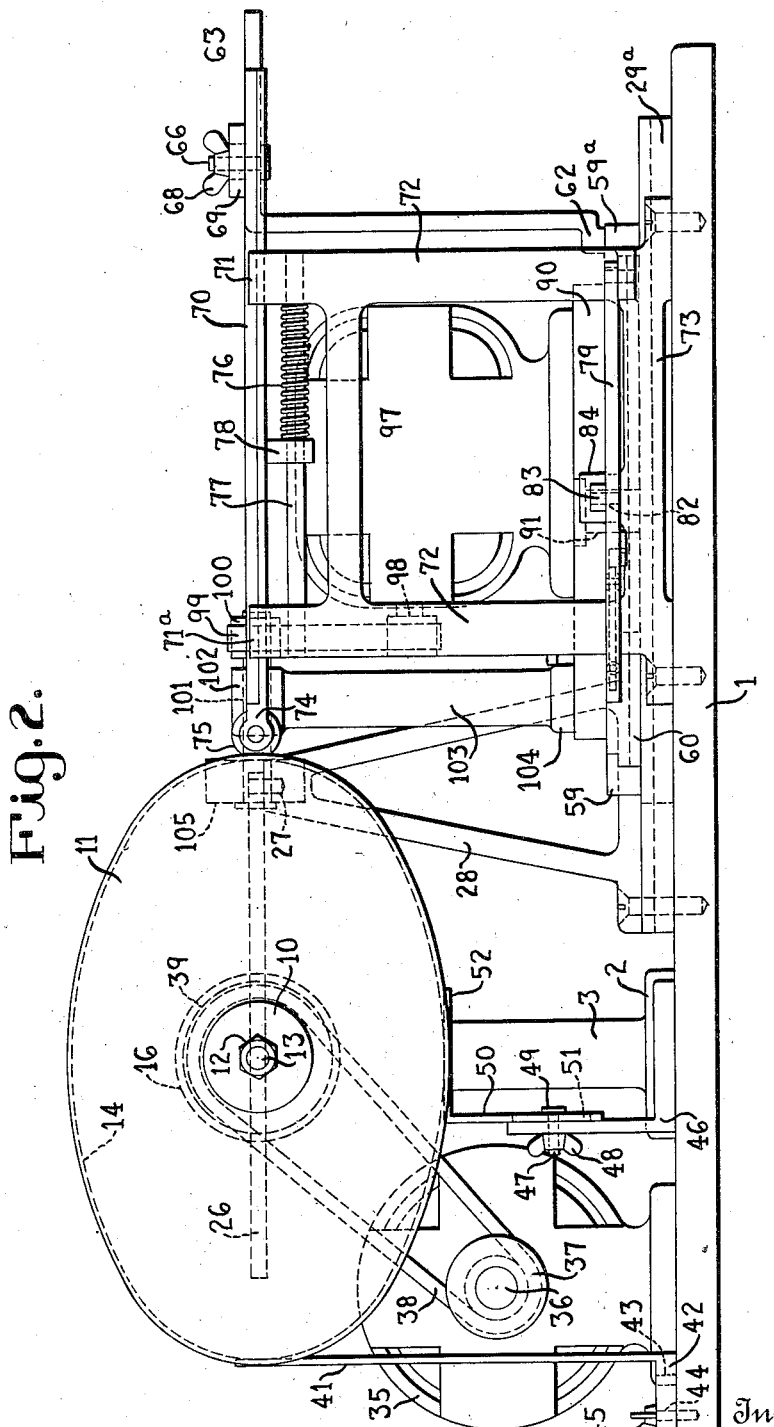
Figure 2 is a side or front elevation of the apparatus shown in Figure 1.
Figure 3:
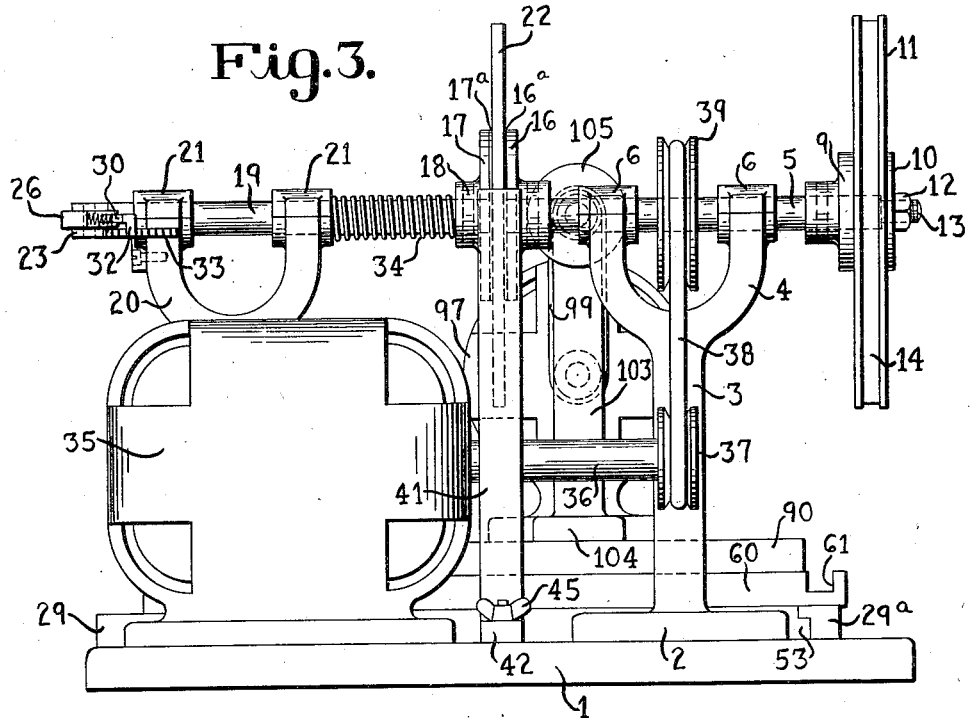
Figure 3 is an end elevation of the apparatus looking at the left end of Figure 1.

Viewing Figures 1 and 2, the right hand end of the bed-plate 1 at the front is provided with a guide-bar 29ª which parallels the guide-bar 29 and between which two guide-bars the base-slide 53 reciprocates. Adjustably mounted on the base-slide is a stop-gage 54 provided with a longitudinal slot 55, through which passes a screw-threaded pin 56 secured to the base-slide 53, and on which a winged nut 57 turns for clamping the stop-gage 54 to the base-slide. A scale-bar 58 is applied to, or formed on, the base-slide 53 along which the gage may be shifted, the calibrations indicating the extent of the shift. At its opposite ends, the base-slide 53 is provided with guide-bars 59, 59ª, in which slides the cutter-base 60, the latter having at its front edge a guide groove 61. The guide-bar 59ª has mounted thereon, by its foot-piece 62, a gage bracket 63 having elongated slot 64 and scale-bar or calibrations 65. A clamping screw 66 extends upwardly from its headed end through the slot 64 and passes through the inner end of a bar 67, a winged nut 68 clamping the bar end to the gage bracket 63. The outer end 69 of the bar is suitably fixed to the outer end of a slide-bar 70, which travels in angular groove bearings 71, 71ª of a rectangular upright 72, the base 73 of which is secured to the bed-plate 1. The inner end of the slide-bar 70 is bifurcated at 74, and, in the bifurcations, an anti-frictional roll 75 is journaled and extends into the groove 14 of the pattern cam 11. The anti-frictional roll 75 is normally held in engagement with the cam 11 and between the flanges thereof by means of a coiled spring 76, see Figure 2, surrounding a bar 77 fixed to the upright 72 and bearing at one end against the latter, its opposite end engaging a lug 78 depending from the slide-bar 70.

By medium of the cam 11 operating upon the roll 75, the slide-bar 70 is moved to the right, Figure 1, in opposition to the spring 76, which normally tends to drive the slide-bar with its roll 75 toward, and hold the same in engagement with, the cam 11. Thus the reciprocations of the slide-bar 70 are imparted to the bar 67, which, in turn, reciprocates the slide-base 53, which reciprocates in and between the guides 29, 29ª relatively to the base 1 and carries the cutter-base 60 with it. The cutter-base 60 may be reciprocated or shifted or adjusted in the guides 59, 59ª of the slide-base by means of the lever 79 pivoted at one end 80 to the base of the upright 72 and having between its ends an elongated slot 81, in which operates a pin 82 carried by a bar 83 guided in, and sliding through, an angular aperture in a lug 84 of the base 73 of the upright, said bar having at its inner end an anti-frictional roll 85 which slides in the groove 61 between the walls thereof. The lever 79, at its outer end, has the spring pawl 86 pivoted thereto at 87, the detent end 88 of which engages the ratchet-bar 89 fixed upon the base 73 of the upright 72. Thus, by shifting the lever 79, the cutter-base 60 can be shifted in the guides 59, 59ª, regardless of the position of adjustment or the movement imparted to the base-slide 53, the stop-gage 54 regulating this movement.

Figure 4:
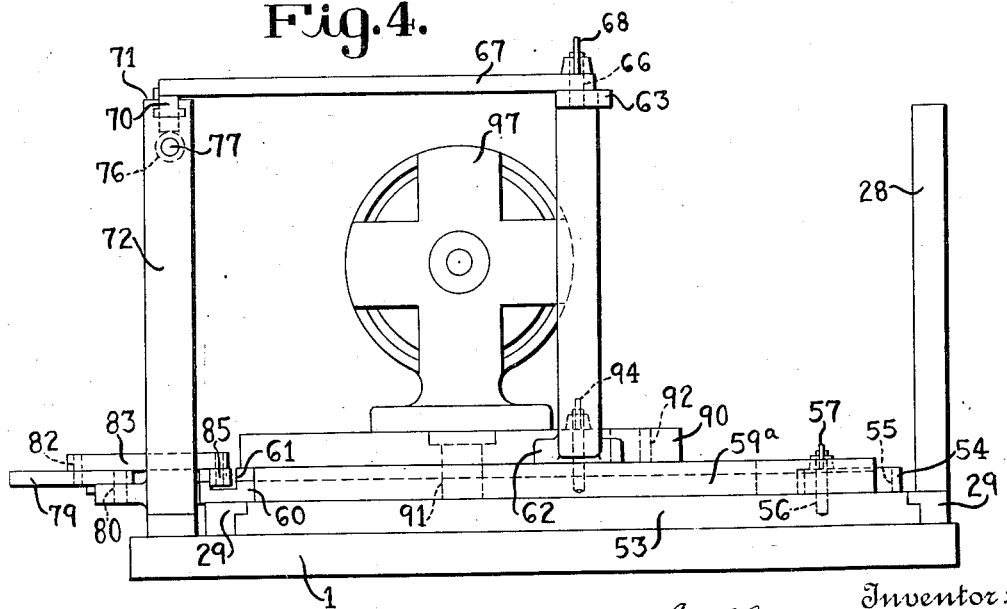
Figure 4 is an end elevation looking at the right end of Figure 1.

The cutter-base 60 has mounted thereon the cutter carrier 90 in the form of a disk journaled centrally at 91, Figures 1 and 4, upon the cutter-base 60, said disk having an arcuate slot 92 therein through which projects a screw 93, upon which a winged nut 94 may be turned to clamp against the carrier 90 to hold the same in any desired position of rotary adjustment relatively to the scale 95, an indicating pointer 96 being applied to the carrier 90. Mounted upon the carrier 90 is a motor 97, the shaft of which is provided with a pulley 98 around which a driving belt 99 is passed, and which drives the pulley 100 on the shaft 101 journaled in the upper end 102 of a post 103, the lower end of which is secured by foot-piece 104 to the cutter carrier 90. The outer end of shaft 101 has removably fixed thereto a functional tool cutting, grinding, beveling or polishing wheel, disk or tool 105. This member obviously may have any desired form and may be of any substance suitable for the particular operation in hand; that is to say, it may be a cutter, grinder, buffer or polisher, and can be replaced at any time according to the operation desired to be carried out. Being mounted with the motor 97 upon the cutter-carrying disk 90, it can be circularly shifted so as to be set relatively to the work 22 at any desired angle, thus giving to the work any desired bevel. Likewise, through the medium of the cutter-base 60, the cutter and its mountings can be shifted toward and from the work so as to set the cutter in any desired initial position relatively to the work. Also, the cutter, through the medium of the base-slide 53, can be shifted in parallelism with the work to either right or left, so as to give the work the proper extent of bevel or cut, as well as the proper size compared to the cam 11. That is to say, the size of the finished product produced from the work 22 can be regulated, regardless of the size of the pattern cam 11, it being understood that the latter, regardless of its size, is merely the medium by which the proper form, corresponding to the form of the pattern cam, is given to the work. The cam automatically reciprocates the cutter relatively to and in parallelism with the work. Variations in size of said form are brought about by shifting the cutter parallel with the work through the medium of the slide-base 53 under control of the adjustable bar in the gage bracket 63, the slide-base 53 being constantly reciprocated, during the operation of the apparatus, through the medium of the pattern cam 11, spring 76, slide-bar 70, bar 67, and connections to the slide-base 53. The extent of the bevel given to the periphery of the work 22 is regulated by shifting the cutter-base 60 by the lever 79 and connections into engagement with the stop-gage 54, which may be set along the scale 58, thus determining the depth of cut and extent of bevel. The angle of the bevel is regulated by shifting the cutter through the medium of the cutter-carrying disk 90 adjustable rotarially relatively to the scale 95. The motor 97 operates the cutter at predetermined speed, and the motor 35 operates the work and pattern cam at predetermined speed. The speed of the cutter is necessarily considerably faster than that of the work, and the latter may be comparatively slow.

While I have shown spring 76 for forcing the roll 75 against the periphery of the pattern cam 11, I desire it understood that the reverse of this may be brought about by extending the slide-bar 70 parallel to the pattern cam 11 and causing the anti-frictional roll to operate upon the outer end or at the left of the pattern cam, viewing Figures 1 and 2. The spring 76 will then operate to normally draw instead of push the roll 75 against the periphery of the pattern cam 11. Or, the pattern cam may have a face groove and an anti-frictional roll may be carried by an angularly extended arm mounted upon the slide 70, so as to operate within the face cam groove. These different substitute mechanisms are obvious equivalents and are referred to merely to indicate modes in which the pattern cam may be caused to reciprocate the cutting, polishing and buffing disk 105 relatively to the work upon which it operates.

Having thus described my invention, what I claim and desire to secure by Letters Patent is:

1. An apparatus such as described comprising a work holder; means for rotating the work holder; a pattern cam, by which to determine the shape of the work, mounted on the work holder so as to rotate synchronously with the work; a tool for operating on the work; independent means for rotating the tool including a shaft arranged at an angle to the axis of the cam and work; means whereby the tool and its rotating means may be shifted parallel with said shaft and with the plane of the surface of the work under the influence of the pattern cam; and means for shifting the tool at an angle to its other shifting movement and at an angle to said shaft into functional position relatively to the work.

2. An apparatus such as described comprising a rotary clamp for holding the work; a rotary tool for operating upon the work; a rotary cam operating synchronously with the work; a reciprocating slide and means cooperating with the cam for actuating it; a base mounted in the slide and means for shifting it at an angle to the slide; a rotatable carrier for the tool mounted on the base; and means for regulating the position of the carrier so as to adjust the tool relatively to the work.

3. An apparatus such as described having, in combination, means for yieldingly clamping the work in position to be operated upon; means for rotating the work; a tool juxtaposed to operate upon the work; size-regulating means for the finished product; driving means carrying the tool mounted upon the size-regulating means; and means for regulating the angular relation of the tool relatively to the work.

4. An apparatus such as described comprising a work-holding means; a tool for operating upon the work; a pattern; means for rotating the work and pattern simultaneously; means independent of the work rotating means for rotating the tool; means for reciprocating the tool relatively to the work under control of the pattern; means by which to adjust the angular relation of the tool relatively to the work; and means whereby the tool may be shifted toward and from the work.

5. An apparatus such as described comprising a supporting base; work clamping means mounted upon said base having a rotary and right-line shiftable member and a rotary and relatively fixed member; means for shifting the first member into functional position relatively to the other member; a motor mounted on the base in juxtaposition to the clamping means; means connecting the motor and clamping means for rotating the latter; a pattern cam mounted to rotate synchronously with the relatively fixed member; a slide mounted upon the base adjacent the clamping means; means by which the cam may actuate the slide; and a motor mounted to move with the slide; a tool mounted to move with the slide and in cooperative relation to the clamping means, the cam operating to shift the motor and tool in parallelism with the work.

6. An apparatus such as described having a supporting frame; a work clamp comprising a rotary, shiftable clamping member and a rotary, relatively fixed clamping member; a spring for normally holding the shiftable member in contact with the relatively fixed member; a lever mounted on the frame of the apparatus; interacting means between the lever and the shiftable member of the clamp whereby the said member may be shifted in opposition to the control of the said spring; and means including a detent carried by the lever for holding the said member in any position to which it may be shifted.

7. An apparatus such as described having, in combination, a base-plate; a slide mounted on said base-plate; guide-ways on the base-plate in which the said slide may be shifted; a second slide mounted on the first-named slide; guide-ways on the first-named slide in which the second-named slide may be shifted; a lever mounted on the base plate; interacting means between the said lever and second-named slide for shifting the latter relatively to the first-named slide; and cooperating means including a detent carried by the lever for holding the second-named slide in any position to which it may be shifted.

8. An apparatus such as described comprising a supporting base; a slide mounted upon said base; guide-ways on the base in which the slide is adapted to be shifted; a gage bracket connected to the slide; a bar adjustably connected to the bracket; a slide-bar to which the said bar is fixed; guide-ways mounted on the base in which the slide-bar may be shifted; and automatic means for actuating the slide-bar whereby the slide may be reciprocated upon the base.

9. An apparatus such as described comprising a supporting base; guide-ways carried by said base; a slide cooperating with the guides so as to be shifted therein; automatic means for shifting the slide, said slide carrying guide-ways; a second slide cooperating with the guide-ways of the first-named slide and adapted to be shifted therein; manual means for shifting the second slide relatively to the first slide; a carrier journaled upon the second-named slide and adapted to be shifted circularly thereon; means whereby the carrier may be circularly adjusted; a functional tool mounted upon the carrier; means mounted upon the carrier for actuating the tool; the means for actuating the first-named slide including means for presenting the work to the tool and rotating the work relatively to the tool.

STEPHEN R. SPATENGA.